UNITED STATES PATENT OFFICE.

FELIX DE LALANDE, OF PARIS, FRANCE.

IMPROVEMENT IN PROCESSES OF OBTAINING ARTIFICIAL PURPURINE FROM ALIZARINE.

Specification forming part of Letters Patent No. 188,061, dated March 6, 1877; application filed June 7, 1876.

*To all whom it may concern:*

Be it known that I, FELIX DE LALANDE, of Paris, in the Republic of France, have invented a Process for the Production of Purpurine from Alizarine, of which the following is a specification:

My invention consists in treating alizarine with various oxidizing agents. For instance, I mix together one hundred parts of dried and pulverized alizarine, from fifty to one hundred parts of antimonic acid, and from eight hundred to one thousand parts of sulphuric acid at 66° Baumé. This compound is heated gradually to from 392° to 428° Fahrenheit, under continued stirring, until a drop thereof added to dilute caustic soda produces a currant-red color; whereupon, the compound is mixed with a quantity of water equal to from twenty to thirty times the volume of the mass. This is then boiled and, after cooling, filtered, and the residue is washed with water, and may then be used directly as coloring-matter containing purpurine, or it may previously be purified.

I treat the well-known commercial alizarine, which is prepared from madder, in any of the usual ways.

With the several methods of extracting it from the vegetable I do not concern myself, but take the manufactured article and subject it to the above-described process, that constitutes my invention.

What I claim as new, and desire to secure by Letters Patent, is—

The process of obtaining artificial purpurine from alizarine, consisting in combining with the latter antimonic acid and sulphuric acid, heating the mixture, and adding water thereto, and then boiling, cooling, and filtering the solution to obtain a residue or dye-stuff, substantially as herein set forth.

In testimony whereof I have signed my name to this specification before two subscribing witnesses.

F. DE LALANDE.

Witnesses:
JULES ARMENGAUD,
ROBT. M. HOOPER.